US006661195B1

(12) United States Patent
Schmidt et al.

(10) Patent No.: US 6,661,195 B1
(45) Date of Patent: Dec. 9, 2003

(54) STARTING MOTOR FOR AN INTERNAL COMBUSTION ENGINE, HAVING A SAFETY DEVICE

(75) Inventors: Karl-Otto Schmidt, Keltern (DE); Thomas Karamudas, Kornwestheim (DE); Marcus Rosenberger, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/688,450

(22) Filed: Oct. 16, 2000

(30) Foreign Application Priority Data

Oct. 15, 1999 (DE) ........................................ 199 49 822

(51) Int. Cl.[7] .............................. H02P 1/26; H02P 7/36

(52) U.S. Cl. ....................... 318/778; 318/783; 318/825; 318/430

(58) Field of Search ......................... 318/767, 778–779, 318/781–783, 812, 822, 825–826, 430, 434; 388/934

(56) References Cited

U.S. PATENT DOCUMENTS

| | | | | | |
|---|---|---|---|---|---|
| 3,633,073 | A | * | 1/1972 | Day, III | 361/22 |
| 5,510,687 | A | * | 4/1996 | Ursworth et al. | 318/727 |
| 5,828,200 | A | * | 10/1998 | Ligman et al. | 318/807 |
| 5,984,033 | A | * | 11/1999 | Tamagawa et al. | 318/376 |
| 6,104,157 | A | * | 8/2000 | Kramer et al. | 318/445 |
| 6,124,690 | A | * | 9/2000 | Yano et al. | 318/376 |
| 6,124,692 | A | * | 9/2000 | Canada et al. | 318/490 |
| 6,170,241 | B1 | * | 1/2001 | Shibilski et al. | 318/434 |
| 6,297,742 | B1 | * | 10/2001 | Canada et al. | 318/490 |
| 6,422,331 | B1 | * | 7/2002 | Ochiai et al. | 318/434 |

FOREIGN PATENT DOCUMENTS

| | | |
|---|---|---|
| DE | 27 00 982 | 7/1978 |

* cited by examiner

*Primary Examiner*—Marlon T. Fletcher
(74) *Attorney, Agent, or Firm*—Kenyon & Kenyon

(57) ABSTRACT

A starting motor for an internal combustion engine, where a control circuit monitors or controls the temperature of the starting motor or the carbon brushes, and if necessary, limits or switches off the primary current. The temperature is indirectly determined by means of a comparison, using the voltage ripple in the primary circuit between the battery and the starting motor. Occurring errors can be stored as status messages in an error storage device, and if desired, they can be interrogated and corrected at the next service interval.

9 Claims, 1 Drawing Sheet

STARTING MOTOR FOR AN INTERNAL COMBUSTION ENGINE, HAVING A SAFETY DEVICE

BACKGROUND INFORMATION

It is known to ascertain the thermal loading of the starting motor (abbreviated as starter) by measuring the armature current or the temperature of the carbon brushes, using appropriate sensors. However, the known devices have the disadvantage of being relatively costly, since additional sensors are needed. For example, an appropriate temperature sensor is needed to measure temperature, the sensor having to be in proximity to the carbon brushes, in order that it can essentially detect their temperature. The known methods for measuring current also require a measuring element, e.g. a shunt in the measuring line or, in the case of a contactless measurement, e.g. a Hall sensor. Both methods exact costs for the sensors, wiring, as well as their installation, and are an additional risk to the reliability of the starting motor. Furthermore, a circuit arrangement for electric starting motors is known from German Patent No. 2700982, which evaluates the time-related current variations or voltage variations of the current supplied to the starting motor. If the variation over time falls below a predefined threshold value, this is interpreted as sustained operation of the internal combustion engine, and the starting motor switches off, since the voltage variations are smaller during sustained engine operation than during starting.

SUMMARY OF THE INVENTION

The starting motor of the present invention has the advantage of the installation not requiring additional hardware such as sensors, wiring, possibility for control, etc., since these functions can be implemented by the components already present in the control circuit. It is considered to be especially advantageous that, from the measurement of the voltage ripple, e.g. by simulation or empirical measurement, one can easily derive local temperature peaks, e.g. at the carbon brushes, or derive the load of the starting motor. In certain operational situations, such as “cranking” for a long time after a cold winter night, or running by means of the starter, without the support of the motor, while a ship is being loaded (because the tank is empty), the starter can experience overloading which would result in it being damaged or destroyed. This is advantageously prevented by the subject matter of the present invention.

It is particularly advantageous that the induction flux to the internal combustion engine is immediately interrupted by switching off the primary current, and therefore, the starting motor cannot be heated any further. The starting motor can then only be used again after it cools off, in order to prevent it from being damaged.

It is also favorable that the armature current of the starting motor can be ascertained indirectly from the data already existing for a corresponding reference starter. It is often necessary to determine the armature current, since the temperature of the starting motor carbon brushes can be ascertained, using this value. A high armature current results in a correspondingly high temperature, due to the heating of the starting motor, as well as the heating of the sparking brush, while the temperature is lower at a lower armature current.

A further advantage is that, for purposes of control, the measured voltage-ripple values can be read off at a corresponding output. For purposes of servicing, this simplifies the discovery of a possible error source. Errors can then be read out during the next maintenance inspection of a motor vehicle.

Since the control circuit is normally equipped with a small microcomputer chip, the existing control circuit can be advantageously expanded, using a corresponding, supplementary software program as a control program for the starting motor. The improvement of the control-circuit reliability is also particularly advantageous, since the unneeded components mean that no risk of error can arise. Furthermore, every type of starting motor can easily be accommodated by a simple modification of the control program.

It is also regarded as an advantage that the limiting load for the starting motor can be appropriately adjusted by taking the ambient temperature into account. For example, the limiting value can be correspondingly reduced at a high ambient temperature since, in this case, it is possible for damage to occur earlier.

DETAILED DESCRIPTION

Figure 1:
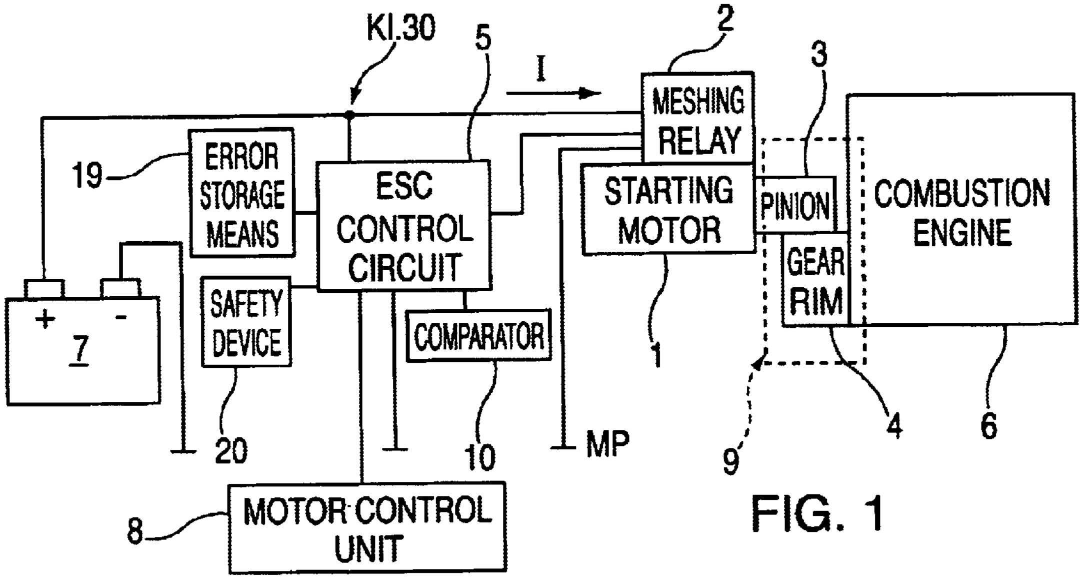
FIG. 1 shows a block diagram as an overall view, according to the present invention.

The block diagram of FIG. 1 shows a starting motor 1 having a gear box 9, whose power take-off shaft, which is not shown, is arranged through a pinion 3 in such a manner that pinion 3 meshes with the teeth of a gear rim 4 during the starting phase of internal combustion engine 6, and thus, sets the crankshaft of internal combustion engine 6 into the intended angular motion. Attached to starting motor 1 is an electrically operated meshing relay 2, by means of which the closed linkage between starting motor 1 and internal combustion engine 6 is ensured during the starting operation. Meshing relay 2 is electrically connected, via its control input, to the output of a control circuit 5 (ESC), to which a control output of a motor control unit 8 is connected. A comparator 10 and a measurement input are connected to further inputs of control circuit 5; the measurement input being wired, via terminal 30 of the starter circuit, between a battery 7 and a terminal on meshing relay 2. In addition, control circuit 5 is connected to an error storage means 19, as well as to a safety device 20. It also follows from FIG. 1 that all of the mentioned devices are connected to the negative pole of the battery.

The alternative of installing individual devices 10, 19, 20 in a housing, together with control circuit 5, is provided.

Figure 2:
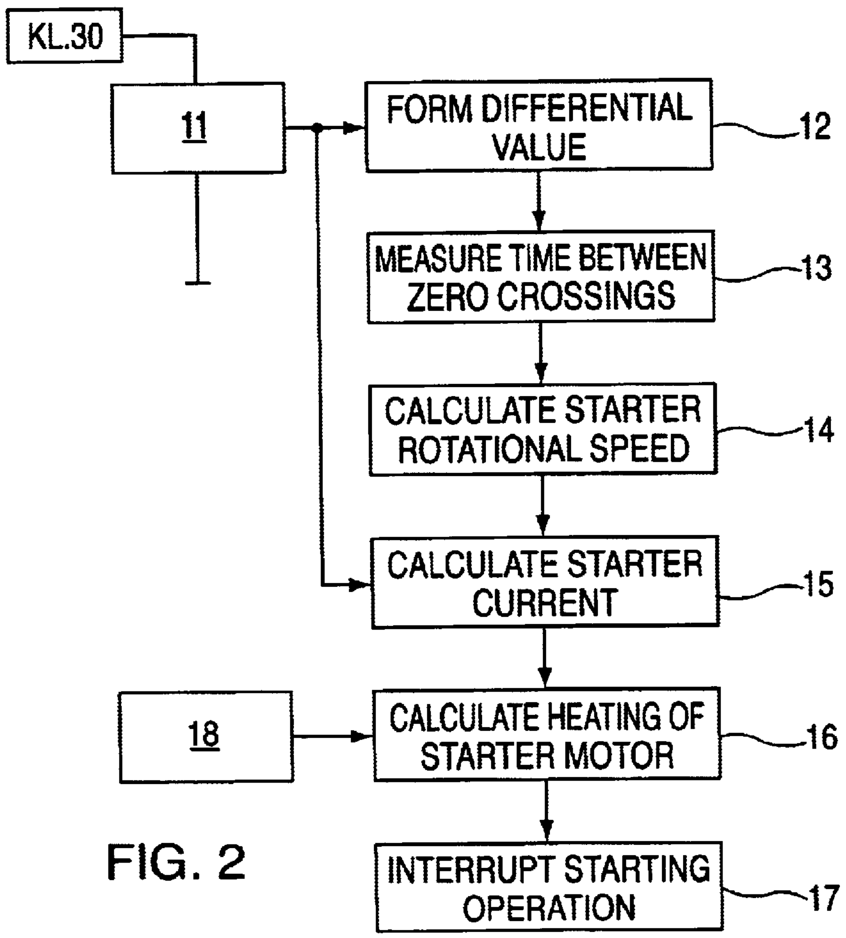
FIG. 2 indicates a flow chart, according to the present invention.

The method of functioning of control circuit 5, along with safety device 20, is now explained in detail, referring to FIG. 2. It must be pointed out in advance that control circuit 5 normally includes elements already, which control meshing relay 2 prior to the starting of starting motor 1, in such a manner that pinion 3 is first slid into gear rim 4 before the angular motion begins. After the pinion of starting motor 1 meshes with gear rim 4 of internal combustion engine 6, the meshing relay therefore switches on the starter current, so that the starting motor starts and drives the crankshaft of the internal combustion engine by means of mentioned pinion 3 and gear rim 4. Because of the friction and the compression of the pistons in the individual cylinders, internal combustion engine 6 generates a braking torque at gear rim 4, which is not constant, but largely periodic. Starter current I (primary current of the starter) is a function of the torque to be applied. Because the periodic moment causes starting motor 1 to draw a periodic current from battery 7, periodic voltage dips occur at terminal 30, which are measured by control circuit 5, in that, e.g. an analog-digital converter (AD converter) digitizes the voltage at terminal 30, and supplies it to a computer chip in control circuit 5. The program, which is used to control the computer chip in control circuit 5, and whose purpose is to control meshing relay 2 or the entire starting operation, is already well-known, and must therefore not be explained in further detail. It is regarded as novel and inventive that control circuit 5 includes an additional program routine, by which the voltage ripple simultaneously measured at terminal 30 is subsequently processed to the effect that the period duration and the ripple frequency are calculated as a function of the starter type and combined with the voltage values, to obtain the current flow through the starting motor. Then, the heating at various points in the starting motor, especially at the carbon brushes, is calculated therefrom. For example, the calculation parameters for the warming of starting motor 1 or its carbon brushes are derived from empirical comparison measurements, which were previously acquired at a reference starter. This calculated value is supplied to safety device 20, which compares this value to a corresponding value of a comparator 10. If this limiting value is exceeded or undershot, the starter current for starting motor 1 is preferably limited or switched off.

This operation is explained again in principle in the flow chart of FIG. 2, in which the further program routine is set up.

As already mentioned above, the battery-voltage ripple is measured at terminal 30, by an AD converter 19. In position 12, control circuit 5 forms a differential value from the average value of the last converter values, this differential value being subtracted from the current converter value. In position 13, the time between the zero crossings is measured, and in position 14, the starter rotational speed is calculated therefrom. Taking into consideration the type of starting motor 1, starter current I is calculated (position 15) from the digitized voltage value of AD converter 19, and from the starter rotational speed. Taking the ambient temperature into account, the heating of starting motor 1 is then calculated in position 16, from the existing data, by comparing them to the values stored for the separate temperatures. In position 17, the starting operation is interrupted by safety device 20, e.g. in response to the allowable limit temperature being exceeded, in order to protect starting motor 1 from possible damage.

Of course, other known methods for measuring the voltage ripple can also be used in place of the AD converter.

Furthermore, it must be pointed out that the control circuit has an error storage means 19, in which the error messages of the safety device are stored after the predefined limit value is exceeded. For example, these error messages are saved in the long term, along with the date, time, temperature, etc. of starting motor 1, until the next service check, at which time this error message can be read out and, if necessary, the cause can be investigated.

What is claimed is:

1. A starting motor for an internal combustion engine, having gearing to the engine, the gearing producing a closed linkage between the starting motor and the engine, during a starting operation of the engine, the starting motor having a battery, the starting motor comprising:

a control circuit for measuring at least one of a starter voltage and a starter current that causes a crankshaft of the internal combustion engine to be driven, the control circuit determining at least one of the starter current, a temperature rise and a load at at least one point of the starting motor as a function of a voltage ripple in a primary circuit of the starting motor;

a comparator for presetting a maximum load of the starting motor;

a Schmitt trigger for emitting a signal from load values and a predefined limiting value, in response to the limiting value being one of exceeded and undershot; and a safety device for limiting an induction flux to the engine, in response to an appearance of the signal.

2. The starting motor according to claim 1, wherein the safety device is adapted to switch off a primary current to the starting motor.

3. The starting motor according to claim 1, wherein the control circuit determines an armature current of the starting motor.

4. The starting motor according to claim 1, wherein the control circuit determines a carbon-brush temperature of the starting motor.

5. The starting motor according to claim 3, wherein the armature current is one of displayed and read off.

6. The starting motor according to claim 4, wherein the carbon-brush temperature is one of displayed and read off.

7. The starting motor according to claim 1, wherein the control circuit includes a control program for determining at least one of the voltage ripple, a temperature, and a load of the starting motor.

8. The starting motor according to claim 1, further comprising a temperature sensor coupled to the control circuit for measuring an ambient temperature, the control circuit determining the limiting value as a function of the ambient temperature.

9. The starter motor according to claim 1, further comprising:

a first line over which the at least one of the starter voltage and the starter current is supplied from the battery to the closed linkage; and a second line coupled to the first line and over which the at least one of the starter voltage and the starter current is supplied to an input of the control circuit.

* * * * *